Feb. 10, 1953 W. D. BARLOW 2,627,920
PARKING SYSTEM FOR VEHICLES
Filed June 29, 1950 3 Sheets-Sheet 1

INVENTOR:
Wallace D. Barlow,
BY Homer P. Montague
ATTORNEY

Feb. 10, 1953 — W. D. BARLOW — 2,627,920
PARKING SYSTEM FOR VEHICLES
Filed June 29, 1950 — 3 Sheets-Sheet 2

INVENTOR
Wallace D. Barlow,
BY Homer R. Montague
ATTORNEY

Feb. 10, 1953  W. D. BARLOW  2,627,920
PARKING SYSTEM FOR VEHICLES
Filed June 29, 1950  3 Sheets-Sheet 3

INVENTOR
Wallace D. Barlow
BY Homer R. Montague
ATTORNEY

Patented Feb. 10, 1953

2,627,920

UNITED STATES PATENT OFFICE 2,627,920

PARKING SYSTEM FOR VEHICLES

Wallace Dudley Barlow, Hyattsville, Md.

Application June 29, 1950, Serial No. 171,117

3 Claims. (Cl. 161—15)

This invention pertains to pay-on-departure parking stalls for vehicles, and provides a fully automatic means for control of such parking.

An important object of my invention is the conservation of labour in the operation of commercial parking garages, parking lots and the like; and it is not intended primarily for the control of curb parking. The use of the system and equipment herein described enables the motorist to park and unpark his own vehicle, obviating the customary delay in calling an attendant, paying the cashier, and waiting for the attendant to bring the vehicle. In addition to the saving in time and expense, many motorists prefer to park their own cars rather than risk damage to their vehicles by careless attendants.

An additional object is to make possible the utilization as parking areas of small parcels of real estate too small for economic operation as an attended parking lot.

Existing pay-on-departure parking stalls are exemplified by U. S. Patent 2,015,607 to La Delphia Shinn. This device entraps the vehicle by lowering a gate-like barrier in the rear of the vehicle. Vehicle actuated switches control a vacancy sign. When the motorist is ready to leave he pays the amount shown as due on a parking meter, pulls down a lever which raises the gate and backs out.

U. S. Patent 2,462,610 teaches of a vehicle actuated switch which resets a parking meter to zero, the object being to prevent other vehicles from using the time remaining of the period originally paid for. A similar device is described in U. S. Patent 2,229,183. U. S. Patent 1,826,492 issued to Roger Babson requires the motorist to place a chain around one wheel, plugging an attachment on the end of the chain into an electrical circuit passing through a socket on the curb. U. S. Patent 1,973,275 has a plate against which the vehicle parks, the plate controlling an electrical circuit.

My invention differs from the above described patents, primarily in that my equipment entraps the vehicle at hub height, does not surround the vehicle with barriers, and in the case of all but one embodiment, is fully automatic. My equipment is also "fail-safe," and in the event of a power failure or the like will not entrap the parked vehicle.

One form of the invention is illustrated in the accompanying drawings, in which Figures 1, 3, 4, 5, 6 and 7 are longitudinal sections; Figure 2 is a view from the rear of a stall showing the manner in which a wheel of the vehicle is entrapped;

Figure 5 shows a modification incorporating a mechanical resetting device, and Figures 6 and 7 show a modification permitting the motorist to leave the stall by backing out.

Figures 1 to 5 show the preferred embodiment of my invention, in which the motorist enters and leaves in the same direction. In Figure 1 a vehicle entering to park strikes a needle contactor 17, of the type used to count vehicles at toll bridges and the like. This contactor, when pushed away from the vertical, closes an electrical circuit to a parking meter of the conventional time-registering type 8. In other words the needle contactor 17 senses the presence of a vehicle, prior to the actual entrance of the vehicle into the entrapping mechanism.

After striking the contactor 17, the wheel of the entering vehicle next strikes a "tip-board" 1, consisting of two boards, each about 1" by 12" by 36", rigidly connected by a shaft 2 joining the long edges of the boards. These boards form an angle of about 135 degrees with each other, and the shaft 2 with its attached cam 21, is free to rotate through the arc permitted by the boards and the floor of the parking stall, i. e. about 45 degrees. The tip-board 1 is normally in the Figure 1 position; or at the other end of its arc, with one of the two boards flat on the floor of the parking stall. A spring 3 operating downwardly, and located in a suitable depression under the assembly, when operative, holds the tip-board 1 in position to receive a vehicle, as shown in Fig. 1. When the stall is occupied, a locking device, to be described later, acts against the spring 3, preventing its operation, and holding the tip-board assembly in such a position that it cannot receive a vehicle, nor can it release a vehicle in the forward direction. When the tip board 1 is in this position, i. e. when the stall is occupied, a spring-loaded trap-board 20 prevents the motorist from backing out.

Figures 1 to 4 show in detail the means for locking and releasing the tip-board 1 so that payment may be collected for the time during which the stall is occupied. Figure 1 shows a rod 5, free to move vertically into three positions, up, central and down. In Figure 1 the rod 5 is resting in a shallow depression 6 in the cam 21, which holds the rod 5 in its central position. A deep depression 7 in the cam 21 is provided also, which corresponds with the down position of the rod 5. The nose of the cam 21, when the shaft 2 is turned through a full arc in either direction will force the rod 5 into the up position.

Figure 1:
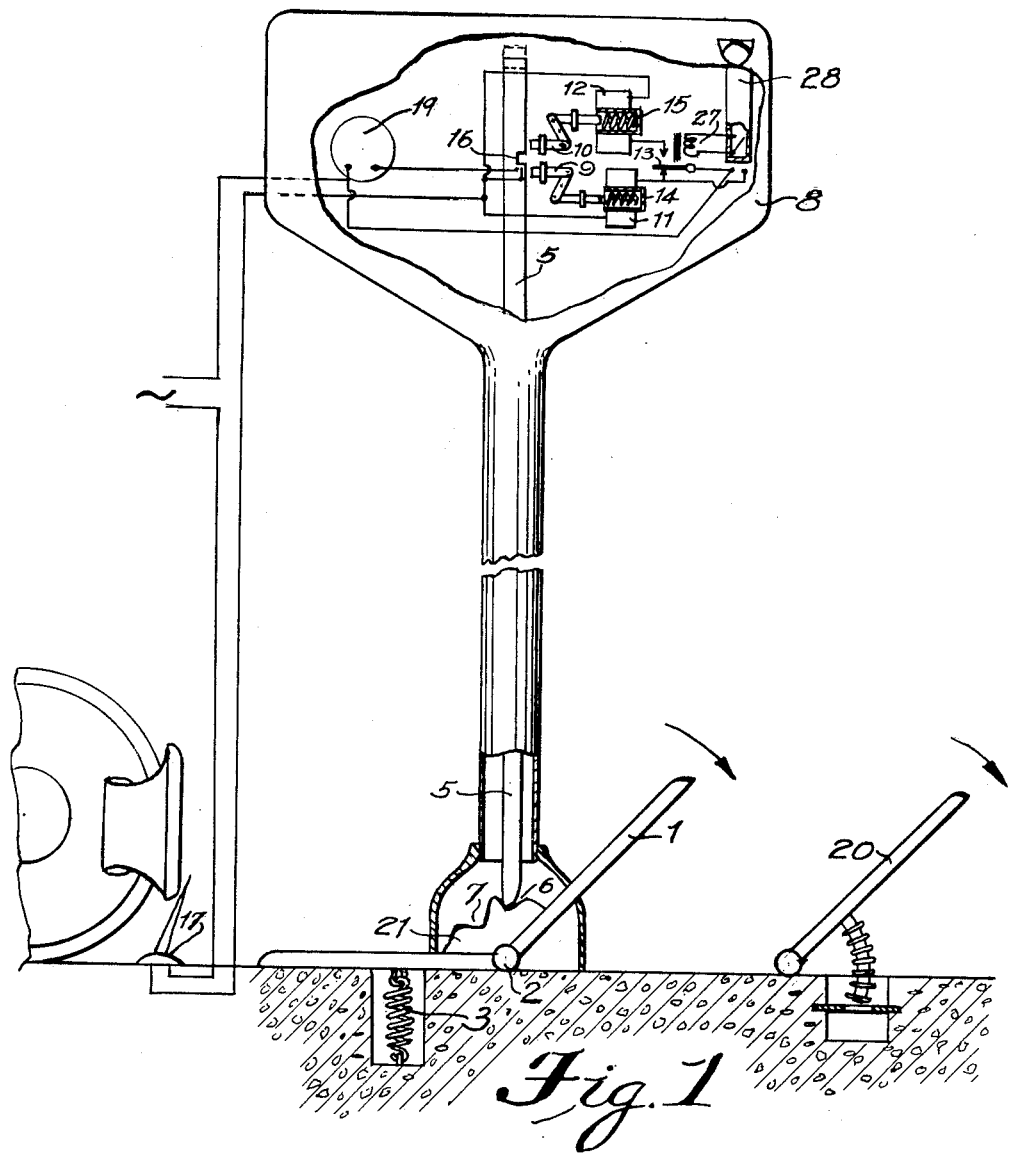
Figure 2:
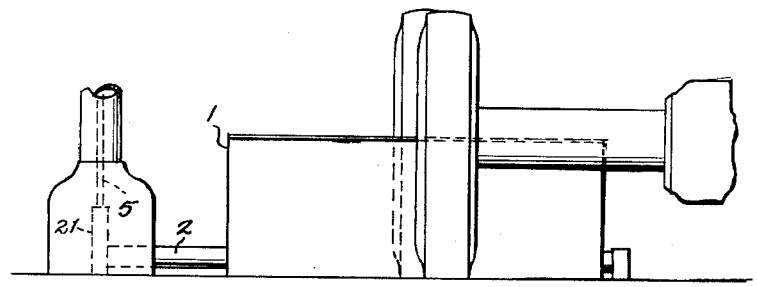
Figure 2 is a view from the rear of the stall showing a vehicle in place; the rear wheel is prevented from going forward by the position of the tip-board 1. The tip board 1 cannot be turned back into the Figure 1 position until the meter has been paid.
Figure 3:
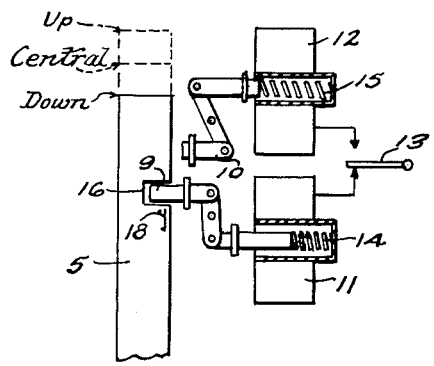
Figure 3 shows the condition of the tip-board 1 and the meter 8, when a vehicle is parked.

Returning to Figure 1: The rod 5 extends into a parking meter of the conventional time registering type 8. This meter contains, in addition to the time measuring and indicating clockwork, two locking tongues, 9 and 10 capable of moving horizontally into, left; or out of, right, an operative or locking position. These tongues will not lock except when the controlling solenoids, to be described later, are supplied with current; also they must be opposite a key-way 16 in the rod 5. When the circuit which supplies the meter with current is broken, the tongues 9 and 10 are held in a non-operative position, right, by the springs 14 and 15.

The locking tongues 9 and 10 are controlled by solenoids. A "locking" solenoid 11 controls 9; and a "release" solenoid controls 10. Both solenoids are controlled by a two position thermal delay switch 13, which normally connects the power source, which may conveniently be 110 volts A. C., with the "locking" solenoid 11, and while the stall is in use the tongue 9 holds the rod 5 in the down position, thereby preventing movement of the tip-board 1. This is the condition of the device when current is on the meter, and when the thermal delay switch 13 is in position 1. See Figure 1.

Figure 4:
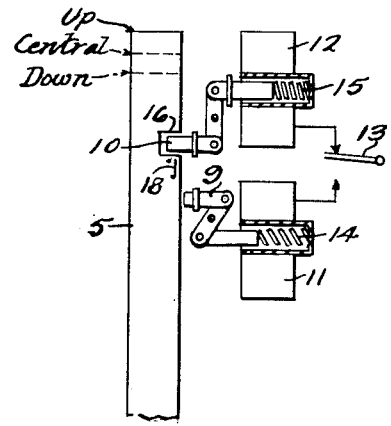

Release of the vehicle is accomplished as follows: The thermal delay switch 13 is under the control of a coin selector 28 of conventional type. When the motorist desires to leave he pays the amount indicated on the dial of the meter. The coin selector 28, by means of a simple relay of conventional type 27 actuates the thermal delay switch 13, causing it to move to position two, Fig. 4, for a time period of about two minutes. In moving to position two, the thermal delay switch 13 breaks the circuit to the locking solenoid 11 and connects the release solenoid 12 into the circuit. This breaking of the circuit causes the release of the locking tongue 9 and causes the locking tongue 10 to become operative for the specified time-delay period, (at the end of which the thermal delay switch 13 will return to position one). Now, since the removal of the locking tongue 9 has freed the rod 5, the shaft 2 of the tip-board 1 is free to rotate, and will be pulled to the Figure 1 position by the spring 3. This will cause the rod 5 to move upwardly, bringing its keyway 16 opposite the locking tongue 10, which now being in condition to operate will move left into the keyway 16, locking the rod 5 in its up position. This removes the tip-board 1 from any control by the rod 5, leaving it under the control of the spring 3 which is now holding it in the Figure 1 position.

With the equipment in this condition the motorist is free to leave. See Figure 4. As his vehicle leaves, the first thing accomplished is breaking contact with the needle contactor 17, allowing it to spring back to its normally vertical position, and breaking the current previously flowing to the meter. When this happens, the locking tongue 10 will be pulled to the right, its non-operative position, by the spring 15, again freeing the rod 5. The rear wheel of the vehicle now passes over the tip-board 1, turning it momentarily to the clockwise end of its arc, a position in which it is normally locked. This time however, no current is on the meter, due to no contact with the needle contactor 17, and the equipment will not lock, instead being returned to the Figure 1 position, ready to receive a new vehicle.

If the motorist should not leave before the expiration of the two minute time delay period, the thermal delay switch 13 will return to its normal, or number one position, i. e. passing current to the locking solenoid 11. Tongue 10 will release, dropping the rod 5 to its central position. Tongue 9 cannot enter the keyway 16, because of the position, but will press against the rod 5, under the control of the locking solenoid 11. The meter 8 will continue to operate, in that it will continue to count time, but the motorist will be capable of leaving at any time without paying the meter. In order to prevent the motorist from securing free parking for this indefinite period of time, an alarm switch 18 is placed in such a position on the rod 5 that it is closed by the pressure of the locking tongue 9. This energizes a gong 19, controlled by switch 18. When this alarm sounds, which will occur at the end of the two minute time delay period, the motorist is offered three alternatives: to allow his car to remain in the space, knowing that the alarm will bring a supervisor, also suffering embarrassment from the noise of the alarm; he can leave the stall, breaking the alarm circuit; or he can deposit an additional coin for another period of parking.

Figure 5:
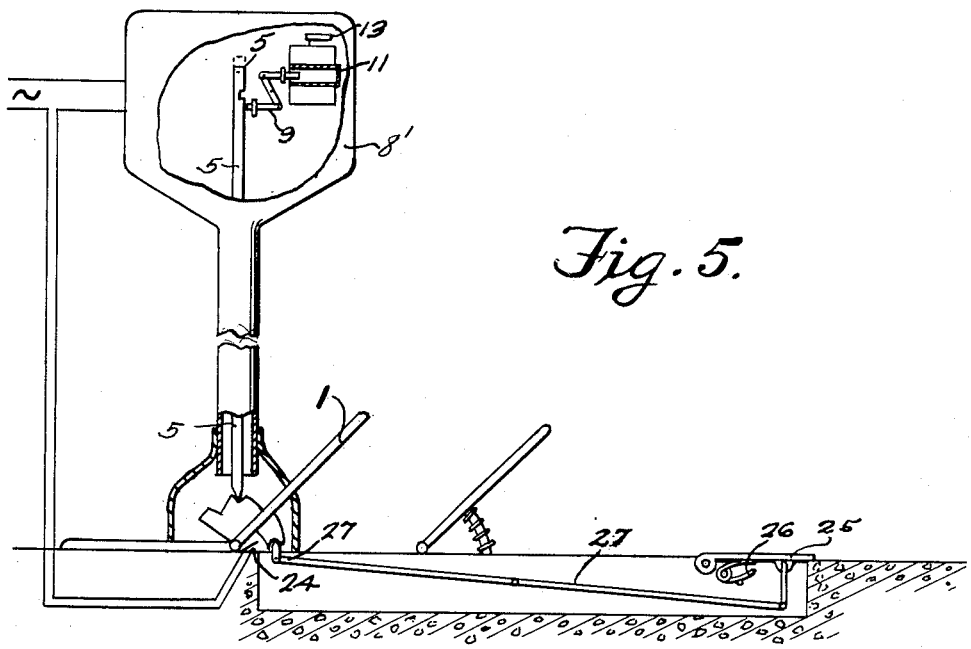

Figure 5 shows a modification which uses a mechanical resetting device, and requires one solenoid rather than the two of the preferred embodiment. In this modification the entering vehicle's front wheel turns the tip-board 1 to its clockwise position, closing a switch 24 which energizes the meter 8'. This current acting as in the preferred embodiment locks the rod 5 in its down position, and starts the meter counting time. When the motorist is ready to leave, he pays the amount shown on the face of the meter, causing the meter to unlock, again as in the preferred embodiment. As his car leaves, the rear wheel kicks the tip-board 1 back into position to receive a new vehicle. This is accomplished by a reset board 25 spring-loaded by an upwardly acting spring 26, and connected to the tip-board 1 by a mechanical linkage 27. When 25 is depressed, the tip-board 1 is turned to its Figure 1 position, ready to receive a new vehicle. In turn, pressure of the spring 26 returns reset board 25 to its ready position, as soon as the pressure from the vehicle is removed.

Figure 7:
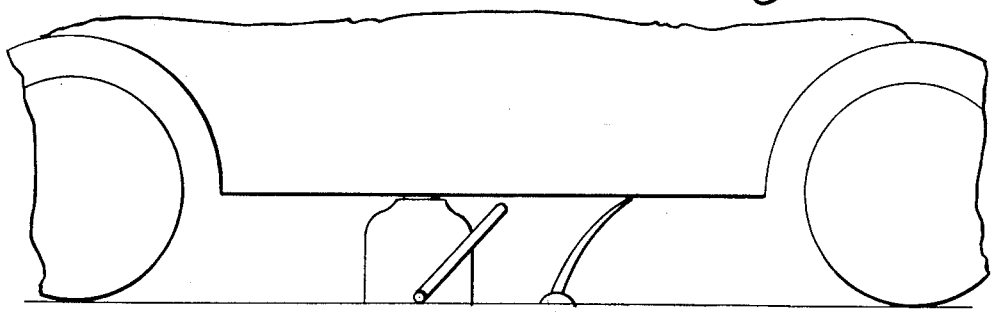
Figure 6:
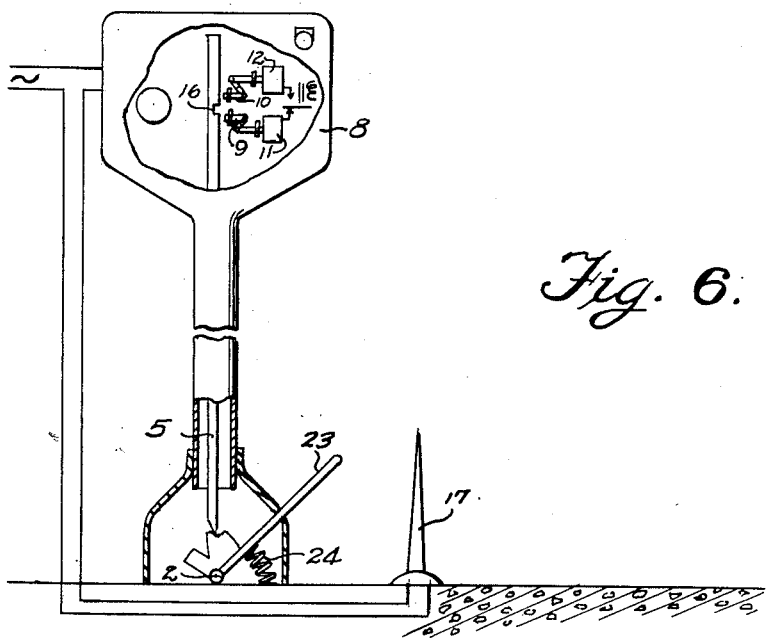

In order to provide for areas where cars are parked facing a wall, and the motorist must leave by backing out, a modification shown in Figures 6 and 7 is provided. Figure 6 shows the device ready to receive a vehicle and Figure 7 shows a vehicle parked. A single trap-board 23 connected to a shaft 2 operates a rod 5 as in the preferred embodiment. The needle contactor 17 is however placed beyond the trap board 23, somewhat nearer the center of the stall, rather than at the entrance to the stall as in the preferred embodiment. The entering vehicle depresses the trap-board 23, turning the shaft 2 in a clockwise position, as shown in Figure 7. This causes the rod 5 to move to its up and down positions successively. The rod does not lock in either of these positions, since current is not yet on the meter, and since the keyway 16 and the locking tongue 9 are so placed that rod 5 will be locked in its central position by the locking solenoid 11. With the passage of the front wheel, the spring 24 returns the trap-board to its up position, returning the rod 5 to its central position. By this time the needle contactor 17 has passed current to the locking solenoid 11, and since the tongue 9 is opposite the keyway 16, the rod 5 is locked, holding the trap board in a position so that the motorist cannot leave by backing out. When the motorist desires to leave, he pays the amount shown on the meter dial, transferring current to the release solenoid, as described in the preferred embodiment. The trap board is now pushed down by the motorist's foot. Locking tongue 10 will now lock the trap-board in its down position permitting egress during the time delay period. On leaving, the car breaks physical contact with the needle contactor 17, breaking the circuit to the meter, and enabling the trap-board 23 to return to its up position under control of the spring 24, as soon as the pressure of the vehicle's front wheel is removed. The needle contactor 17 is mounted closely enough to the trap-board 23 that the circuit to the meter is not broken until the vehicle's front wheel is exerting pressure on the trap-board. If this were not done the trap-board would spring back into its up position before the vehicle had left the stall.

In each modification described it will be noted that the equipment is "fail-safe," and in the event of a malfunction or power outage the motorist will not be trapped, the only loss falling on the owner of the equipment, who will not receive payment for the time the power is off. This will tend to prevent damage to the equipment.

The preferred embodiment shows a coin operated meter. The thermal delay switch 13 and the release mechanism may equally well be operated by a key. This key may then be rented to the motorist on a monthly or yearly basis, in this manner obviating the need to collect funds by means of a coin operated meter, also the need for a time-metering clockwork in the meter.

I claim:

1. A parking system for vehicles, comprising means defining a supporting surface for a vehicle in parked position, a support column mounted adjacent said supporting surface but disposed out of the path of a vehicle passing over said surface, time registering mechanism supported by said column, a control circuit for said time registering mechanism, an operating member connected to operate said control circuit, said operating member having a portion extending through said column to a point adjacent said surface, vehicle operable mechanism disposed upon said surface and connected to said portion to initiate a time registration upon entry of a vehicle into the controlled part of said surface, locking means including a part of said operating member for impeding removal of a vehicle after initiation of a time registration, and coin operated mechanism supported by said column for releasing said locking means.

2. The system in accordance with claim 1, and means actuated in response to a departure of a vehicle from the controlled space for stopping operation of said time registering mechanism.

3. The system in accordance with claim 2, including an alarm arranged to be operated in response to continued operation of said time registering mechanism for a period after operation of said coin operated mechanism.

WALLACE DUDLEY BARLOW.

REFERENCES CITED

The following references are of record in the file of this patent:

UNITED STATES PATENTS

| Number | Name | Date |
|---|---|---|
| 1,726,724 | Warren | Sept. 3, 1929 |
| 2,015,607 | Shinn | Sept. 24, 1935 |
| 2,073,834 | Duany | Mar. 16, 1937 |
| 2,094,216 | Hunter | Sept. 28, 1937 |
| 2,358,747 | Teetor | Sept. 19, 1944 |